United States Patent
Rameil-Green (10) Patent No.: US 9,635,173 B2
(45) Date of Patent: Apr. 25, 2017

(54) METHOD AND DEVICE FOR DISCOVERING AND SYNCHRONIZING SERVICE CAPABILITIES

(71) Applicant: Vodafone GmbH, Dusseldorf (DE)

(72) Inventor: Marc Andre Rameil-Green, Dusseldorf (DE)

(73) Assignee: Vodafone GmbH, Dusseldorf (DE)

( * ) Notice: Subject to any disclaimer, the term of this patent is extended or adjusted under 35 U.S.C. 154(b) by 0 days.

(21) Appl. No.: 14/879,001

(22) Filed: Oct. 8, 2015

(65) Prior Publication Data

US 2016/0105551 A1    Apr. 14, 2016

(30) Foreign Application Priority Data

Oct. 9, 2014  (EP) .................................... 14188291

(51) Int. Cl.
| | | |
|---|---|---|
| *H04M 3/42* | (2006.01) | |
| *H04M 3/428* | (2006.01) | |
| *H04L 29/08* | (2006.01) | |
| *H04L 29/06* | (2006.01) | |

(52) U.S. Cl.
CPC .... *H04M 3/42272* (2013.01); *H04L 65/1006* (2013.01); *H04L 65/1016* (2013.01); *H04L 65/1063* (2013.01); *H04L 65/1069* (2013.01); *H04L 65/1073* (2013.01); *H04L 67/306* (2013.01); *H04L 69/24* (2013.01); *H04M 3/4288* (2013.01)

(58) Field of Classification Search
CPC .. H04W 4/20; H04L 65/1016; H04L 65/1073; H04L 65/1063
USPC ............ 455/414.1, 435.1, 435.2, 403, 412.1, 455/412.2
See application file for complete search history.

(56) References Cited

U.S. PATENT DOCUMENTS

| | | | |
|---|---|---|---|
| 8,655,357 B1 | 2/2014 | Gazzard et al. | |
| 2007/0254625 A1* | 11/2007 | Edge | H04M 7/0078 455/404.1 |
| 2010/0329244 A1* | 12/2010 | Buckley | H04W 76/026 370/352 |
| 2011/0040836 A1* | 2/2011 | Allen | H04L 65/1093 709/205 |
| 2012/0214480 A1 | 8/2012 | Ionescu | |
| 2013/0094494 A1* | 4/2013 | Lim | H04W 76/025 370/352 |
| 2016/0234164 A1* | 8/2016 | Kweon | H04W 8/08 |

OTHER PUBLICATIONS

European Search Report for EP 14 18 8291 dated Mar. 16, 2015.
(Continued)

*Primary Examiner* — Cong Tran
(74) *Attorney, Agent, or Firm* — Workman Nydegger (57) ABSTRACT

In a cellular communication system a radio terminal registers a network based service, e.g. a Communication Waiting supplementary service. By transmitting a register request comprising a corresponding option tag, the radio terminal explores whether the network supports the requested network based service. In that case a user profile associated with the requesting radio terminal is updated and the radio terminal may henceforth use that service.

13 Claims, 6 Drawing Sheets

(56) References Cited

OTHER PUBLICATIONS

"3rd Generation Partnership Project; Technical Specification Group Core Network and Terminals; Communication Waiting (CW) using IP Multimedia (IM) Core Network (CN) subsystem; Protocol specification (Release 12)", 3GPP Standard; 3GPP TS 24.615, $3^{rd}$ Generation Partnership Project (3GPP), Mobile Competence Centre ; 650 Route Des Lucioles; F-06921 Sophia-Antipolis Cedex; France, vol. CT WG1, No. '112.1.0, Jun. 27, 2014, pp. 1-27, XP050774405, [retrieved on Jun. 27, 2014] *p. 6 ** p. 8 * p. 17 *.

* cited by examiner

METHOD AND DEVICE FOR DISCOVERING AND SYNCHRONIZING SERVICE CAPABILITIES

CROSS-REFERENCE TO RELATED APPLICATIONS

This application claims the benefit of and priority from European Patent Application No: 14188291.0, filed Oct. 9, 2014, the entire disclosure of which is expressly incorporated by reference herein in its entirety.

BACKGROUND

1. The Field of the Invention

The invention relates to a method and a corresponding communication system for discovering and synchronizing service capabilities, in particular a method for discovering and synchronizing service capabilities between user equipment and a cellular telecommunications network, particularly an LTE network.

2. The Relevant Technology

Mobile telecommunication systems have evolved from circuit-switched techniques to packet-switched information exchange. In $3^{rd}$ generation mobile cellular systems like UMTS, i.e. in the Universal Mobile Telecommunications system, voice connections as well as non-voice connections are implemented as packet-switched services. A plurality of services have been implemented, wherein many of these are designed for providing so-called multimedia services. The so-called IP multimedia subsystem (IMS) has been designed to enable connections between conventional cellular communication systems like UMTS or even GSM with IP-based networks, i.e. networks implementing the packet-oriented IP standard. Basically the IMS uses the so-called Session Initiation Protocol (SIP) for establishing and controlling communication sessions between multimedia devices.

Voice over LTE (VoLTE) is a service that provides voice and video services over an LTE system using the IP multimedia subsystem (IMS). The VoLTE system is based on the MMTel, i.e. the MultiMedia Telephony service, which provides fixed and mobile real-time multimedia communication. In contrast to legacy circuit switched telephony services MMTel uses an IP-based transport over the mobile access.

To make full use of the capabilities provided by a radio terminal and a communications network, the capabilities have to be synchronized between the entities. In other words, the use of a particular service of a telecommunications system requires compatibility of all entities implementing that service. Since radio terminals and telecommunication networks may differ in properties and capabilities, the radio terminal and the telecommunications network have to ensure that the desired service is supported by the entities, i.e. the radio terminal and the telecommunications network have to explore and synchronize each other's capabilities.

In one embodiment the Communication Waiting (CW) service is of interest. The 3GPP specifications have specified two mutually exclusive technical options to implement the Communication Waiting (CW) supplementary service with the technical specification TS 24.615, i.e. namely a 'terminal based' method and a 'network based' method. In a terminal However, the GSMA PRD IR.92 specification is the industry standard for terminal, network and network service vendors that mandates which aspects of the 3GPP/IETF standards shall be used to deploy voice, video and SMS services over VoLTE. The implementation of the Communication Waiting service method mandated/required by the IR.92 is the 'terminal based' method, which only now has identified limitations to using this 'terminal based' approach, e.g. multi-SIM services, SIM swap scenarios and multi device scenarios.

For example, when terminal based communication waiting is used in a multi device scenario, a plurality of at least two devices, e.g. IR.92 compliant radio terminals, share a single, common set of network services, where each of the devices may respond to an incoming call. When one of the devices is busy, i.e. a voice call is already established to one of the devices, another incoming call will be signaled to both devices, i.e. the network will signal the incoming call to both devices. The user may then either accept or decline the call. The user may also configure the settings of the device or devices to allow a call-waiting tone to be signaled in this "communication waiting" case. The network only conveys messages between the caller radio terminal and the called radio terminal but does not need to have any knowledge about the status of the called radio terminal, i.e. the network does not need to know if the called radio terminal is in a busy state. So in the 'terminal based' scenario each of the devices operates as a separate entity, i.e. the communication waiting service is configured locally to the device, and must be configured separately for each service, i.e. the entire management of the "communication waiting" service is performed by the devices. Accordingly, when using the 'terminal based' approach, there is no mandate for information to be available in the network that allows to manage such services for all devices assigned to one MSISDN/user.

Problems of this kind, e.g. the management of user settings for the Communication Waiting service or similar services, can be solved by using the 'network based' approach to implement the Communication Waiting service.

However, current VoLTE deployments of devices and networks are too advanced to change network and device support for implementing the Communication Waiting or a similar service. Also, a simple change to the standards is not enough to solve above identified problems, because a design should provide backwards compatibility between devices and/or networks which only support the 'terminal based' CW, whilst providing the preferred solution for those devices and networks which both support the 'network based' approach. As a consequence a common solution is required within the industry.

Both networks and devices need to behave differently depending on whether the 'network based' or the 'terminal based' approach of a service, e.g. the "Communication Waiting" service, is utilized. Today, devices and networks are mandated to deploy the "terminal based" method only. However, it is a target to have full device and network support for the "network based" method to avoid above described issues. But until then, over time there will be a mix of devices which support the terminal based method only, and ones supporting both with backwards compatibility, as well as networks that support the terminal based method only and networks that support both methods with backwards compatibility.

Hence, there is a need for a method and system whereby a device, i.e. a radio terminal, and network can mutually discover support for the network based method, in order to know how the optimal method to invoke a service, e.g. the Communication Waiting supplementary service.

BRIEF SUMMARY

The present disclosure generally relates to one or more improved devices and corresponding networks, methods and/or apparatuses for implementing backwards compatible device and network service capability discovery mechanisms, e.g. the Communication Waiting supplementary service.

In accordance with a first set of embodiments a cellular radio communication system comprising an IP Multimedia subsystem and a Multimedia Telephony application server communicatively coupled to the IP Multimedia subsystem is disclosed, wherein the IP Multimedia subsystem is adapted for receiving a REGISTER message from a radio terminal, said REGISTER message comprising an option tag indicating a network based service supported by the radio terminal and said option tag requesting information whether said network based service is supported by the cellular communication system; and the IP Multimedia subsystem is adapted to acknowledge said REGISTER message by transmitting an positive response message to the radio terminal, and the IP Multimedia subsystem is adapted to transmit a third party REGISTER message to the Multimedia Telephony application server, said third party register message comprising the full REGISTER request and comprising the positive acknowledge message; and the Multimedia Telephony application server is adapted to transmit a positive response message to the IP Multimedia subsystem indicating receipt of the third party REGISTER message; and the Multimedia Telephony application server is adapted to transmit a message request to the IP Multimedia subsystem, said message request indicating support of the network based service by the Multimedia Telephony application server; and the IP Multimedia subsystem is adapted to forward the message request to the radio terminal; and the radio terminal is adapted to update a local variable corresponding to the indicated support of the network based service upon receipt of the message request and to transmit a positive acknowledge message to the IP Multimedia subsystem; and the IP Multimedia subsystem is adapted to forward the positive acknowledge message to the Multimedia telephony application server; and the Multimedia Telephony application server is further adapted to update a user profile associated with the radio terminal corresponding to the positive acknowledge message of the radio terminal forwarded by the IP Multimedia subsystem.

Other aspects of the invention correspond to method steps and respective radio terminals.

In this way the proposed devices and corresponding methods solve the problem of discovering network and device capabilities by exchanging messages between the radio terminal and the network.

BRIEF DESCRIPTION OF THE DRAWINGS

A further understanding of the disclosed embodiments may be realized by reference to the accompanying drawings. In the figures, similar components, features or entities may have the same reference label.

DETAILED DESCRIPTION

Figure 1:
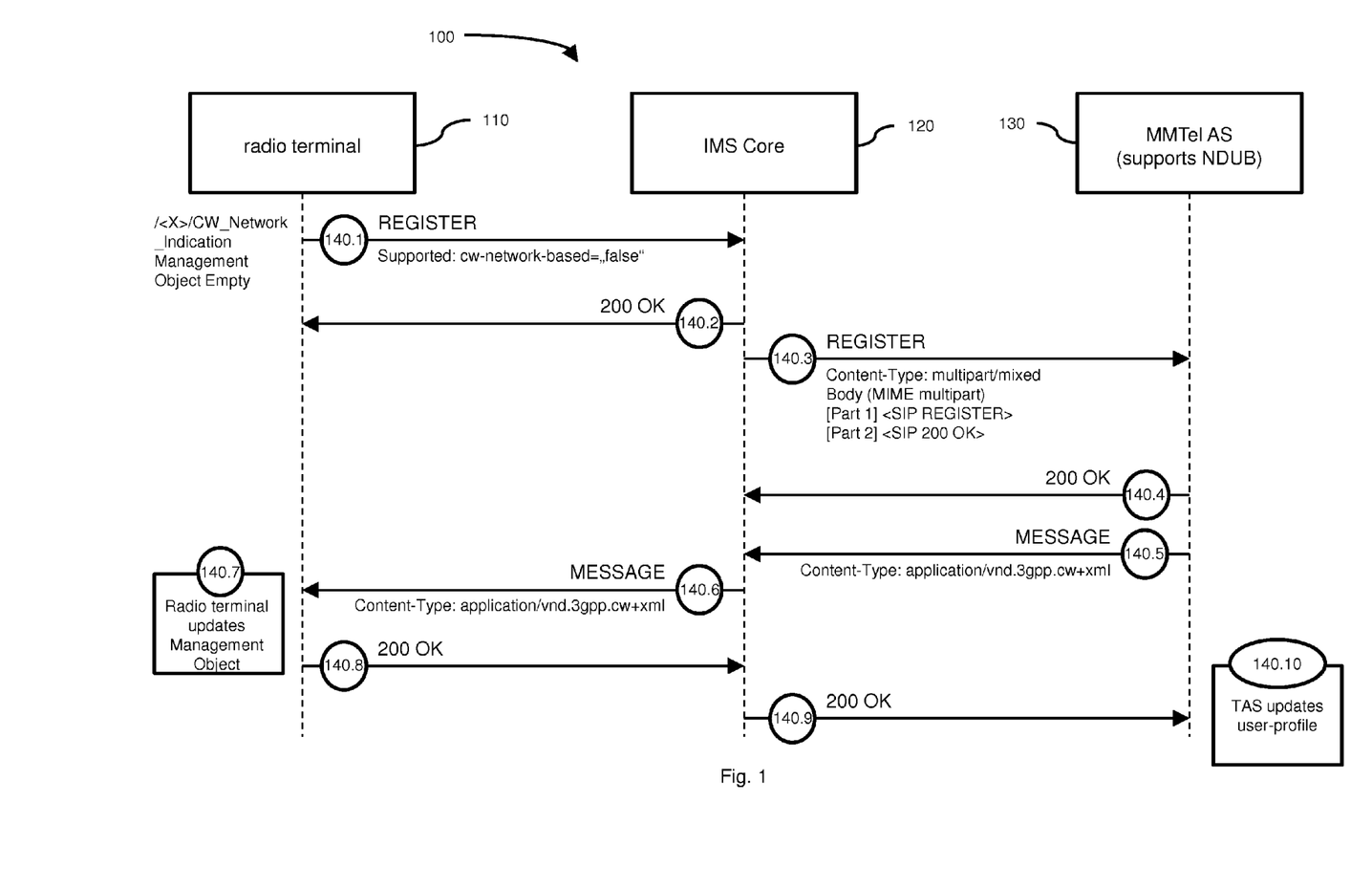
FIG. 1 depicts a message exchange sequence for registering a network based "Communication Waiting" service with a cellular communication network.

FIG. 1 depicts a block diagram of a message exchange in a cellular communication system 100 between a radio terminal 110, an IP Multimedia Subsystem (IMS) core 120 and a MultiMedia Telephony Application Server (MMTel AS) 130.

The radio terminal 110 in the context of this description shall include cell phones or mobile phones, Personal Digital Assistants (PDAs), smart phones or computers like tablets or laptops or a so-called user equipment (UE) as specified in the UMTS specification or any other terminal capable to participate in the scenarios as subsequently described. In the following these devices are called radio terminals. In particular the term may comprise terminals capable of handling LTE services, particularly the Voice over LTE service. However, the invention shall not be limited by this, i.e. the term may comprise terminals operating over WiFi in other embodiments.

The IP Multimedia Subsystem (IMS) Core 120 is the framework for providing IP multimedia services, for example as designed by 3GPP, wherein the IMS core in one embodiment may form part of an LTE network.

Note that the IMS as well the radio terminal use the Session Initiation Protocol (SIP) as specified in the RFC 3261 for establishing, modifying and terminating sessions comprising one or more media streams. SIP is an application layer protocol that is designed to be independent of underlying transport layer, i.e. SIP may run for example on Transport Control Protocol (TCP), User Datagram Protocol (UDP) or Stream Control Transmission Protocol (SCTP). As is known SIP may be operated in conjunction with other application layer protocols that identify and convey session media. Note that in the context of this disclosure messages are exchanged using the SIP protocol. However, the invention should not be limited by this particular protocol.

The MultiMedia telephony application server 130 is a server providing 3GPP/NGN IP Multimedia Subsystem (IMS) multimedia telephony services that at least supports IP transport over the mobile access, i.e. mobile access technologies are provided such as high-speed packet access (HSPA) and 3GPP long-term evolution (LTE). Though the disclosed embodiments describe an MMTel application server, the invention shall not be limited in this regard, instead any corresponding application server can be used.

In all message exchange scenarios as described it is assumed that the radio terminal 110 is already in contact with the network and has already been authorized, hence the scenarios as described in the following do not describe these steps.

FIG. 1 discloses a message exchange of an initial registration of a radio terminal that supports the networked based CW supplementary service. In this scenario MultiMedia Telephony application server 130 and IMS core 120 both support the CW service, particularly application server 130 supports the Network Determined User Busy function as indicated.

Radio terminal 110 provides a local IMS Management Object for storing whether or not the network supports the Communication Waiting service. In one embodiment said IMS management object can be implemented as storage for a Boolean variable, i.e. possible values of the variable are 'false' or 'true'. In the described embodiment said variable is named 'cw-network-based'. A value cw-network-based=false shall indicate that the radio terminal currently considers the network to not support the network based CW supplementary service, while a value cw-network-based=true indicates that the radio terminal considers the network to support the network based CW service.

Since neither the radio terminal nor the network, i.e. IMS 120 and application server 130, have any knowledge about each other's capabilities, the radio terminal has to communicate its capability, i.e. the support of the requested service, to the network and has to check whether the network supports the desired network based CW service. Similarly the network supports the network based CW service but does not have a clue if the radio terminal supports that service.

Note that the following scenarios assume that the radio terminal has been associated with the cellular communication network and is now in a status where application layer messages may be exchanged. The scenarios disclosed below accordingly describe the messages as exchanged by application layers.

In a first step the radio terminal 110 sends a standards based SIP REGISTER request 140.1 towards the IMS network 120. The supported header of the REGISTER message comprises a new option tag, which in one embodiment may be named "cw-network-based", and which is set to false in order to indicate to the network that the device supports the network based CW service and that it needs to discover if the network supports the network based CW service also. Note that the contents of the transmitted option tag corresponds to the setting stored in the local IMS management object of the radio terminal.

As soon as the IP Multimedia subsystem 120 has received the SIP REGISTER request 140.1, it positively acknowledges reception of said request by transmitting a SIP 200 OK message 140.2. Note that at this time the IP MultiMedia subsystem does not yet have the information whether the requested network based service is supported by the system, since that must be checked by the Multimedia Telephony application server 130.

The IP Multimedia subsystem 120 then forwards the full REGISTER request and the response transmitted to the radio terminal in a third party REGISTER message 140.3 to the Multimedia Telephony application server 130. Note that in one embodiment the third party REGISTER request is as defined for the Voice over LTE services (VoLTE).

As soon as the Multimedia Telephony application server 130 receives the REGISTER request, it transmits a positive acknowledge message, i.e. a SIP OK 200, to the IP Multimedia subsystem.

Once the acknowledge message is sent, the MultiMedia Telephony application server parses the received third party REGISTER message 140.3, also parses the REGISTER request message contained therein and thus discovers the option tag. As the option tag provided by radio terminal 110 indicates support of the requested network based service, i.e. in this embodiment the network based Communication Waiting supplementary service, the Multimedia Telephony application server 130 now receives the information that radio terminal 110 supports the network based service, i.e. here the network based Communication Waiting supplementary service, and that said radio terminal requests support of this service by the network.

As the Multimedia Telephony application server 130 supports the requested network based Communication Waiting service, it transmits a SIP MESSAGE request 140.5 to the IP Multimedia subsystem 120, wherein said SIP MESSAGE indicates that the requested service can be provided by the Multimedia Telephony application server 130, i.e. server 130 supports the requested network based service. Note that at this time the Multimedia Telephony application server 130 does not yet update a user-profile associated with the service requesting radio terminal 110.

The IP Multimedia subsystem 120 receives the SIP MESSAGE request 140.5 and forwards said SIP MESSAGE to radio terminal 110 as indicated by message 140.6 in FIG. 1.

Radio terminal 110 receives the SIP MESSAGE 140.6, parses the message, thus discovers that the network supports the requested network based service and updates the local IMS management object (140.7), i.e. radio terminal 110 updates the local storage variable to a value of "true". Note that at this time radio terminal 110 has knowledge of the support of the requested network based service by the network.

Then radio terminal 110 transmits a positive acknowledgement, i.e. a SIP 200 OK message, responsive to SIP MESSAGE 140.6 to the IP Multimedia subsystem 120 as indicated by message 140.8, which forwards the positive acknowledgement as a SIP 200 OK message, in FIG. 1 reference numeral 140.9, to the Multimedia Telephony application server 130.

Multimedia Telephony application server 130 receives and parses the acknowledgement message 140.9, i.e. the SIP OK, and thus obtains the information that the service requesting radio terminal 110 has positively acknowledged the network's indication of support. The Multimedia Telephony application server accordingly stores that information by updating the user-profile associated with the requesting radio terminal 110.

In this way radio terminal 110 has now successfully registered to use the network based Communication Waiting supplementary service with the network. Similarly the network, i.e. the Multimedia Telephony application server, has obtained the information that the radio terminal supports the network based service and will use that. Radio terminal 110 has stored that in the IMS Management Objective indication leaf and the Multimedia Telephony application server has updated the user profile associated with the radio terminal, in particular associated with a user identification associated with the radio terminal, to store this information for the user in the network. As a consequence the radio terminal and the network are in sync. Consequently said network based service can be used from now on.

Figure 2:
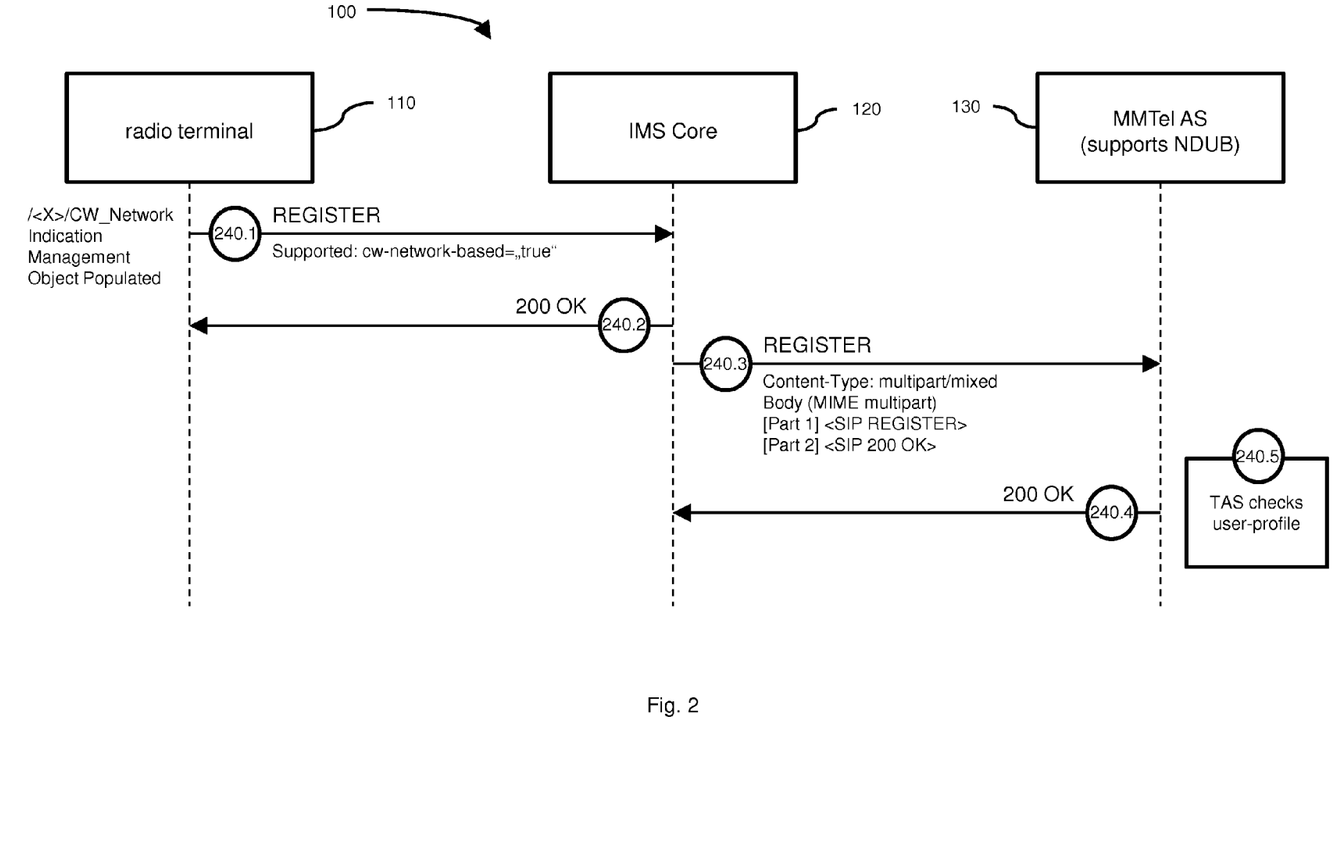
FIG. 2 depicts a message exchange of a subsequent registration of the network based service with the cellular communication network.

FIG. 2 depicts a scenario wherein a radio terminal 110 already as obtained the information that the network, i.e. particularly the IP Multimedia subsystem 120 and the Multimedia Telephony application server 130, supports the network based Communication Waiting service by a previous initial registration with the IP Multimedia subsystem, i.e. as described above with reference to FIG. 1. The local IMS Management Object of radio terminal 110 has been already populated by the previous IMS registration and is set to a value indicating that the network supports the requested service. Note that the message exchange as described in FIG. 2 does not initially set or update but confirms the user-profile setting in the Multimedia Telephony application server 130.

Radio terminal 110 transmits a standards based SIP REGISTER request 240.1 to the IP Multimedia subsystem, wherein the supported header includes the option tag "cw-network-based" with the value "true" to indicate to the network that the radio terminal 110 supports the network based service, i.e. the network based Communication Waiting service, and that through an earlier registration has obtained the knowledge the network also supports the service. That is, in this scenario radio terminal 110 as well as the network components, i.e. the IP Multimedia subsystem 120 and the Multimedia Telephony application server 130 both have knowledge about the previous initial registration message exchange.

Once the IP Multimedia subsystem 120 has received the SIP REGISTER message 240.1, it positively acknowledges the register request by transmitting a SIP 200 OK message 240.2 to radio terminal 110.

After IP Multimedia subsystem 120 has sent acknowledge message 240.2, it sends a third party REGISTER message 240.3 to the Multimedia Telephony application server 130, which includes the full REGISTER request as received from radio terminal 110 and the positive acknowledge message 240.2 within the body of the third party REGISTER request as per filter criteria defined for a VoLTE radio terminal.

Multimedia Telephony application server 130 receives the REGISTER message 240.3 and responds with a positive acknowledge message SIP 200 OK, i.e. as indicated message 240.4. Then Multimedia Telephony application server 130 parses the received REGISTER message 240.3 and checks the user profile associated with a user identifier (240.5) that in turn is associated with radio terminal 110, to ensure the systems are in sync.

By transmitting the above described subsequent registration request, radio terminal 110 may check a user-profile stored in the Multimedia Telephony application server 130. Note that the Multimedia Telephony application server suppresses the updating of the radio terminal as the network and the radio terminal remain in sync. This minimizes the signaling load on the IP Multimedia subsystem, which does not have to send any unnecessary signaling.

Figure 3:
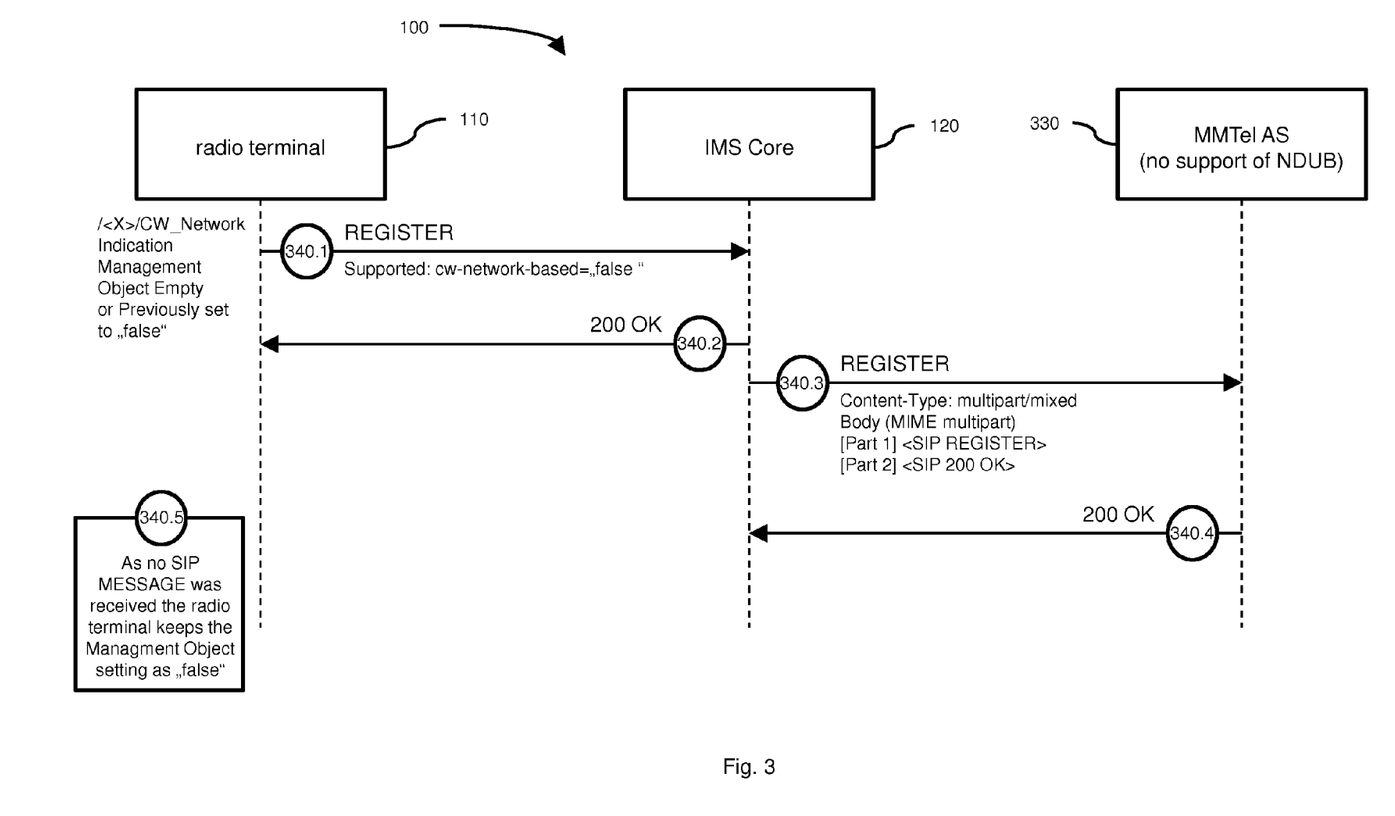
FIG. 3 depicts a message exchange wherein a radio terminal 110 supports the network based service but the Multimedia Telephony application server does not.

FIG. 3 illustrates a scenario wherein a radio terminal 110 supports the network based CW service, but the Multimedia Telephony application server 330 does not support the requested network based service. Note that the value of the IMS management object, which is local to the radio terminal, has been set to false or is just empty to indicate. This value reflects that the local IMS management object has been populated in a previous REGISTER request, but wherein there was no positive acknowledge by the network or that it has not been populated at all.

In FIG. 3 radio terminal 110 sends a standards based SIP REGISTER request 340.1 towards the IP Multimedia subsystem, wherein the supported header includes the option tag "cw-network based" with a value of false to indicate to the network that the requesting radio terminal 110 supports the network based service and that it needs to discover whether the network supports the network based services also. Note that at this point in time the radio terminal 110 supports the network based service but suspects the network does not support the network based service (which is true).

Once the IP Multimedia subsystem 120 receives the SIP REGISTER request 340.1, it positively acknowledges the request by responding with a SIP 200 OK message 340.2. Thereafter the IP Multimedia subsystem 120 sends a third party REGISTER message to the Multimedia Telephony application server 330, wherein the REGISTER message includes in its message body the full REGISTER request received from radio terminal 110 and the corresponding acknowledgement message as defined per filter criteria for VoLTE.

Multimedia Telephony application server 330 receives the third party SIP REGISTER request 340.3 and acknowledges reception by transmitting a SIP 200 OK message 340.4 to the IP Multimedia subsystem 120. Then the Multimedia Telephony application server parses the received request and determines the option tag requesting a network based service that the server 330 does not support, i.e. the server cannot interpret the option tag contained in the request and thus ignores it. Note that the Multimedia Telephony application server 330 in this case does not send a message indicating that the requested network based service is not supported.

Accordingly, radio terminal 110 will not receive a message indicating that the network supports the requested network based service nor will it receive a message indicating that the requested service is not supported. The radio terminal will accordingly leave its local IMS management object as previously set to false or, if the value was empty and thus undefined, will update the value to false. As a consequence the terminal will apply the terminal based Communication Waiting service if necessary.

However, note that the radio terminal may continue to send subsequent registration requests for registering the network based service, as one day the network may support that option.

Figure 4:
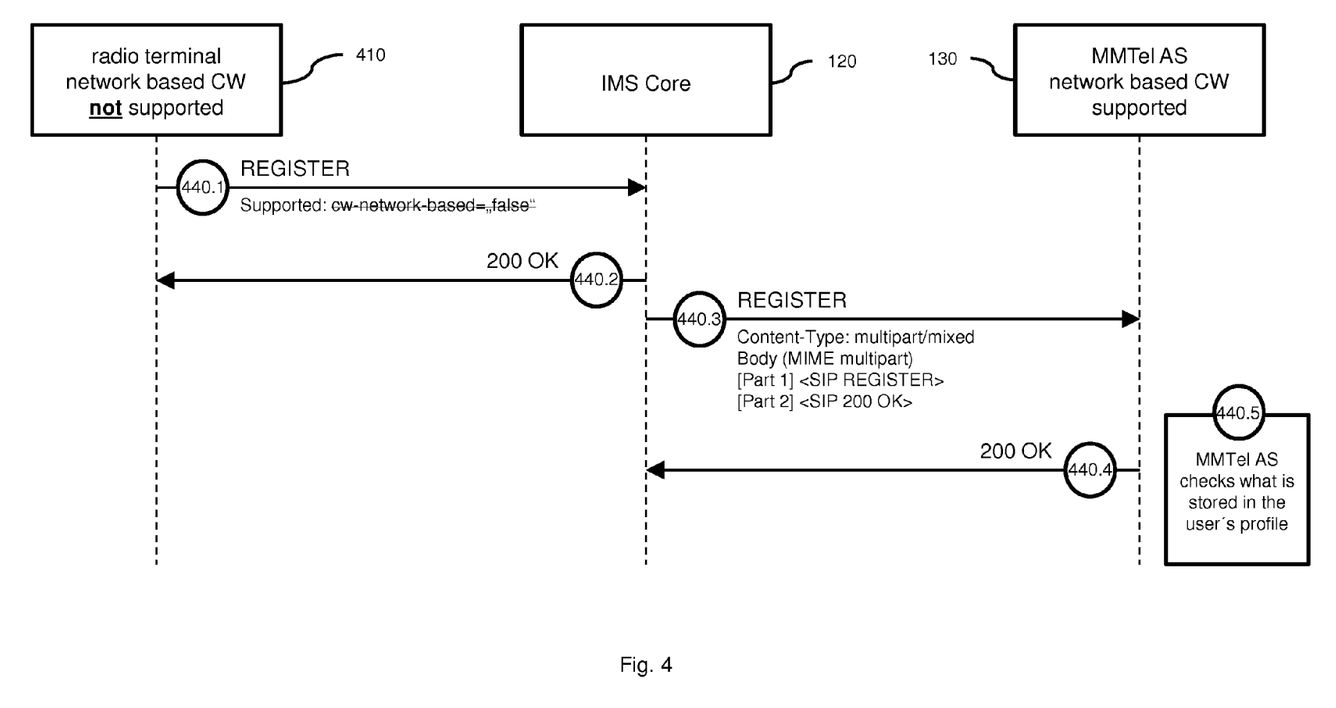
FIG. 4 depicts a scenario wherein a radio terminal does not support the network based service but the network supports the network based service.

FIG. 4 depicts a scenario wherein a radio terminal 410 does not support the network based service and wherein the network supports the network based service. This scenario may occur whenever a radio terminal supports the terminal based Communication Waiting service only, but wherein the network might assume that a user's radio terminal supports a network based service.

In this case radio terminal 410 sends a standard based SIP REGISTER request message 440.1 to the IP Multimedia subsystem 120, wherein the supported header in the message does not include the above mentioned option tag "cw-network-based".

Once the IP Multimedia subsystem 120 has received SIP REGISTER request message 440.1, it positively confirms receipt by sending a SIP 200 OK message to the radio terminal 410.

Similar as described for the previous scenarios, the IP Multimedia subsystem 120 sends a third party REGISTER message 440.3 to the Multimedia Telephony application server 130, wherein the REGISTER message includes in its message body the full REGISTER request received from radio terminal 410 and the corresponding acknowledgement message as defined per filter criteria for VoLTE, but wherein the REGISTER request does not contain the option tag.

Multimedia Telephony application server 130 receives the third party REGISTER message 440.3 and sends a positive acknowledge message 440.4, i.e. a SIP 200 OK, to the IP Multimedia subsystem 120. The Multimedia Telephony application server parses the received message and checks the contents of the supported header against what is stored in the user-profile (440.5). If the user-profile already has stored the non-support for network-based service, i.e. the user-profile correctly reflects that the radio terminal associated with the user-profile does not support the network based service, then the Multimedia Telephony application server does nothing. Otherwise, if the user-profile stored that the user's radio terminal supports the network based service, then the application server 130 updates the user's profile to state the non-support of the network based service, i.e. the non-support of the network based Communication Waiting supplementary service and resets the network setting for service for that user to 'enabled'.

In case there is an incoming call for a radio terminal that is registered in the network as non-supporting the network based Communication Waiting service, and the user profile reflects that non-support correctly, then the incoming call is handled by the network according to conventional methods, i.e. according to terminal based services as specified for example in TS 24.615.

This scenario may occur in case of a so-called SIM swap, i.e. if the user puts his SIM card, which reflects the user identity, in another phone, that does not support the network based service.

Figure 5:
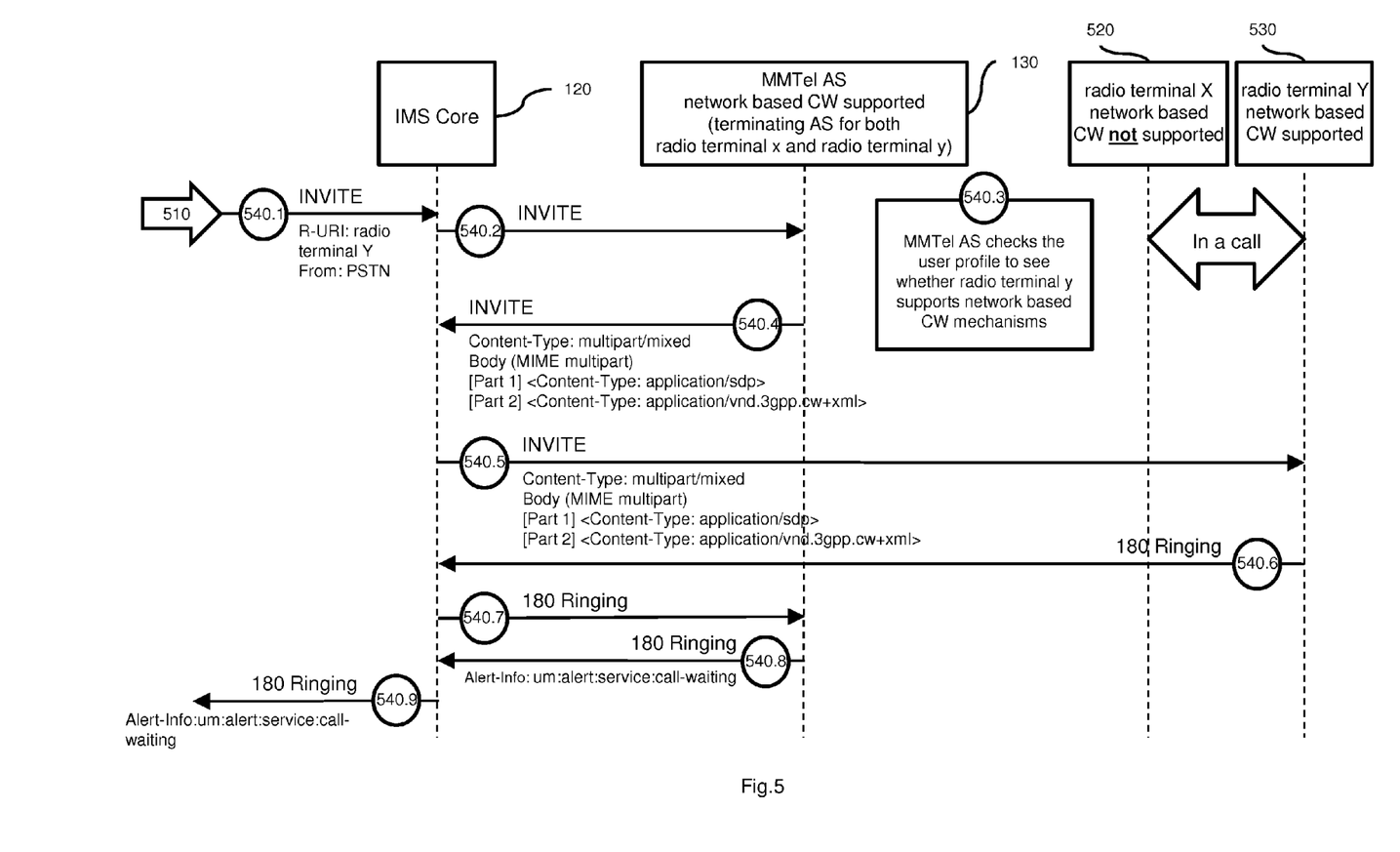
FIG. 5 depicts a scenario of an incoming call inviting a radio terminal in a busy state that does support the network based service and wherein the associated user profile correctly reflects it does.

FIG. 5 illustrates a scenario of an incoming call 510, i.e. an incoming communication session that invites radio terminal Y 530, which in turn is busy in a communication session, i.e. in a call, with another device, e.g. radio terminal X 520. In this scenario the Multimedia Telephony application server 130 is considered as terminating application server for both radio terminals 520 and 530, which are currently in a call. Radio terminal 530, i.e. the radio terminal invited by the incoming communication request does support the network based Communication Waiting service and the associated user-profile correctly reflects that support.

In the cellular communications network, the incoming call 510 is transmitted as an INVITE message 540.1, wherein said INVITE message specifies the requested radio terminal Y 530. The INVITE message 540.1 is received by the IP Multimedia subsystem 120 that in turn forwards the INVITE message as message 540.2 to Multimedia Telephony application server 130.

The Multimedia Telephony application server 130 parses the received INVITE message 540.2, discovers the invitation to a communication session for radio terminal Y 530, and checks the user profile associated with the requested radio terminal Y 530. Then application server 130 handles the INVITE message as standardized in TS 24.615 for the network based communication waiting method and the communication waiting service is enabled and accordingly transmits an INVITE message 540.4 to the IP Multimedia subsystem 120. The further messaging between the involved entities is that as specified in the TS 24.615 standard.

Figure 6:
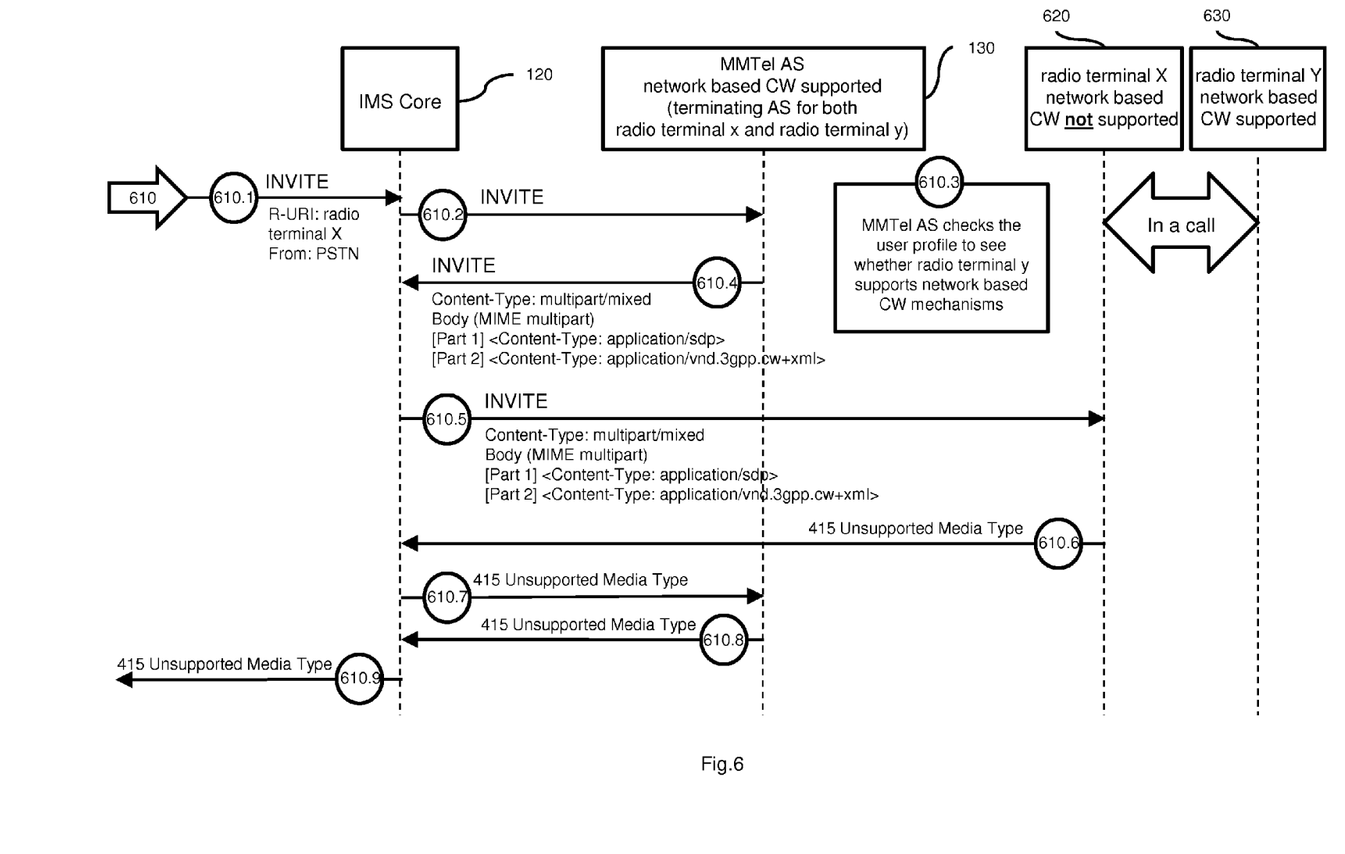
FIG. 6 depicts a scenario of an incoming call inviting a radio terminal in a busy state that does not support the network based service, but wherein the associated user profile indicates it does.

FIG. 6 depicts a hypothetical scenario of an incoming call 610 inviting radio terminal X 620 that currently is in a call with radio terminal 630, wherein the network considers the radio terminal to support the network based service, but actually the radio terminal supports the terminal based service only. The Multimedia Telephony application server 130 in this scenario again serves as the terminating application server for the invited radio station X 620 as well as radio station Y 630 that is in a call with radio station 620. Note that radio station Y 630 supports the network based Communication Waiting service, while the invited radio station X 620 does not support the network based Communication Waiting service, but supports the terminal based Communication Waiting service, and wherein it is assumed that the user profile associated with the invited station X 620 does not correctly reflect the non-support of the network based Communication Waiting service, i.e. the network and the radio terminal are out of sync.

The INVITE message 610, which specifies radio terminal X 620 as callee, is received by the network, i.e. by IP Multimedia subsystem 120, which forwards the INVITE message as 610.2 to Multimedia Telephony application server 130.

When Multimedia Telephony application server 130 receives and parses the INVITE message specifying radio terminal X as callee, the server 130 checks the user profile associated with the radio terminal of the callee, i.e. with radio terminal X 620, in order to check whether the invited, i.e. the called, radio terminal 620, supports the network based Communication Waiting supplementary service. Since the user profile as stored in the network associated with the invited radio terminal does not correctly reflect the non-support of the network based Communication Waiting service, the Multimedia Telephony application server 130 returns the INVITE message 610.4 to the IP Multimedia subsystem 120, which in turn passes the INVITE message 610.5 to the callee, i.e. to radio terminal 620.

When the called radio terminal 620 receives and parses the INVITE message containing multipart MIME objects, namely the SDP for the call and the Communication Waiting indication, it will respond with a SIP message "Unsupported Media Type" 415 message as indicated by message 610.6 to the IP Multimedia subsystem 120 as standardized in the RFC 5621. The IP Multimedia subsystem then transmits a SIP 415 "Unsupported Media Type" message 610.7 to the Multimedia Telephony application server that in turn responds with a SIP 415 "Unsupported Media Type" message 610.8 to the IP Multimedia subsystem 120. Finally the IP Multimedia subsystem 120 responds with a SIP 415 "Unsupported Media Type" to the calling party.

In this scenario the user profile as stored in the network does not correctly reflect the properties of the radio terminal associated with the user profile. This may be caused if a user uses radio terminals having different properties with one SIM card, i.e. one radio terminal supporting the network based Communication Waiting service and another radio terminal that does not provide the network based service. This SIM card swap scenario demonstrates the importance of maintaining the user profile as stored in the network in sync with the radio terminal's actual properties.

The described system and scenario thus describe a method and system for registering a network based service, here the network based Communication Waiting supplementary service, by exchanging messages between a radio terminal and network, wherein the network comprises at least a Multimedia subsystem and a Multimedia Telephony application server. The request comprises an option tag specifying that the radio terminal supports the network based service and seeks to register the use of said network based service with the network. In case the network supports that network based service, the user's profile associated with the registering radio terminal is updated accordingly.

What is claimed is:

1. Cellular radio communication system comprising an IP Multimedia subsystem and a Multimedia Telephony application server communicatively coupled to the IP Multimedia subsystem, wherein:

the IP Multimedia subsystem is adapted for receiving a REGISTER message from a radio terminal, said REGISTER message comprising an option tag indicating a network based service supported by the radio terminal and said option tag requesting information whether said network based service is supported by the cellular communication system;

the IP Multimedia subsystem is adapted to acknowledge said REGISTER message by transmitting a positive response message to the radio terminal, the IP Multimedia subsystem is adapted to transmit a third party REGISTER message to the Multimedia Telephony application server, said third party register message comprising the full REGISTER request and comprising the positive acknowledge message;

the Multimedia Telephony application server is adapted to transmit a positive response message to the IP Multimedia subsystem indicating receipt of the third party REGISTER message;

the Multimedia Telephony application server is adapted to transmit a message request to the IP Multimedia subsystem, said message request indicating support of the network based service by the Multimedia Telephony application server;

the IP Multimedia subsystem is adapted to forward the message request to the radio terminal;

the radio terminal is adapted to update a local variable corresponding to the indicated support of the network based service upon receipt of the message request and to transmit a positive acknowledge message to the IP Multimedia subsystem;

the IP Multimedia subsystem is adapted to forward the positive acknowledge message to the Multimedia telephony application server; and the Multimedia Telephony application server is further adapted to update a user profile associated with the radio terminal corresponding to the positive acknowledge message of the radio terminal forwarded by the IP Multimedia subsystem.

2. The cellular radio communication system of claim 1, wherein:

the IP Multimedia subsystem (120) is adapted for receiving a second REGISTER message from a radio terminal (110), said second REGISTER message comprising an option tag indicating a network based service supported by the radio terminal and said option tag indicating that the network supports the network based service;

the IP Multimedia subsystem is adapted to positively acknowledge receipt of said second REGISTER message to the radio terminal and to forward said REGISTER message in a third party REGISTER message to the Multimedia Telephony application server, wherein said third party REGISTER message includes the full REGISTER request as received from the radio terminal and the positive acknowledge message; and the Multimedia Telephony application server checks the user profile associated with a user profile associated with a user identifier associated with the radio terminal.

3. The cellular communication system of claim 2, wherein the cellular communication system implements the LTE standard, the radio station implements the Voice over LTE service and the network based Communication Waiting supplementary service.

4. The cellular communication system of claim 1, wherein the network based service is the Communication Waiting supplementary service.

5. The cellular communication system of claim 1, wherein the radio terminal (110) is adapted to:

transmit the REGISTER message comprising an option tag indicating support of a network based service by the radio terminal to the IP Multimedia subsystem, said option tag requesting information whether said network based service is supported by said cellular communication system;

receive a positive acknowledge message from the IP Multimedia subsystem;

receive the message request from the IP Multimedia subsystem after the IP Multimedia subsystem transmitted a third party REGISTER message comprising the full REGISTER request and the positive acknowledge message to the Multimedia Telephony application server (130); and update a local variable corresponding to the indicated support of the network based service upon receipt of the message request.

6. The cellular communication system of claim 5, wherein the radio terminal is adapted to transmit a positive acknowledgement message to the IP Multimedia subsystem forwarding said positive acknowledgement message to the Multimedia Telephony application server.

7. The cellular communication system of any preceding claim 5, wherein the radio terminal is further adapted to transmit a second REGISTER message to the IP Multimedia subsystem, said second REGISTER message comprising an option tag indicating a network based service supported by the radio terminal and said option tag indicating that the network supports the network based service.

8. The cellular communication system of claim 5, wherein the radio terminal complies with the LTE standard and implements the network based Voice over LTE service.

9. The cellular communication system of claim 5, wherein the network based service is the Communication Waiting supplementary service.

10. A method for registering a network based supplementary service in a cellular communication system comprising an IP Multimedia subsystem and a Multimedia Telephony application server, coupled to the IP Multimedia subsystem, the method comprising:

receiving a REGISTER message from a radio terminal by the IP Multimedia subsystem, said REGISTER message comprising an option tag indicating a network based service supported by the radio terminal and said option tag requesting information whether said network based service is supported by the cellular communication system;

acknowledging said REGISTER message by transmitting an positive response message to the radio terminal by the IP Multimedia subsystem;

transmitting a third party REGISTER message to the Multimedia Telephony application server by the IP Multimedia subsystem, said third party register message comprising the full REGISTER request and comprising the positive acknowledge message;

transmitting a positive response message to the IP Multimedia subsystem indicating receipt of the third party REGISTER message the Multimedia Telephony application server;

transmitting a message request to the IP Multimedia subsystem, the Multimedia Telephony application server, said message request indicating support of the network based service by the Multimedia Telephony application server;

forwarding the message request to the radio terminal by the IP Multimedia sub system;

updating a local variable corresponding to the indicated support of the network based service upon receipt of the message request and to transmit a positive acknowledge message to the IP Multimedia subsystem by the radio terminal;

forwarding the positive acknowledge message to the Multimedia telephony application server, the IP Multimedia subsystem; and updating a user profile associated with the radio terminal corresponding to the positive acknowledge message of the radio terminal forwarded by the IP Multimedia subsystem by the Multimedia Telephony application server.

11. The method of claim 10, further comprising:

receiving a second REGISTER message from a radio terminal by the IP Multimedia subsystem, said second REGISTER message comprising an option tag indicating a network based service supported by the radio terminal and said option tag indicating that the network supports the network based service;

positively acknowledging receipt of said second REGISTER message to the radio terminal by the IP Multimedia subsystem and forwarding said REGISTER message in a third party REGISTER message to the Multimedia Telephony application server, wherein said third party REGISTER message includes the full REGISTER request as received from the radio terminal and the positive acknowledge message; and checking the user profile associated with a user identifier associated with the radio terminal by the Multimedia Telephony application server.

12. The method of claim 10, wherein the cellular communication system implements the LTE standard, the radio station implements the Voice over LTE service and the network based Communication Waiting supplementary service.

13. The method of claim 10 wherein the network based service is the Communication Waiting supplementary service.

* * * * *